Figure 1:
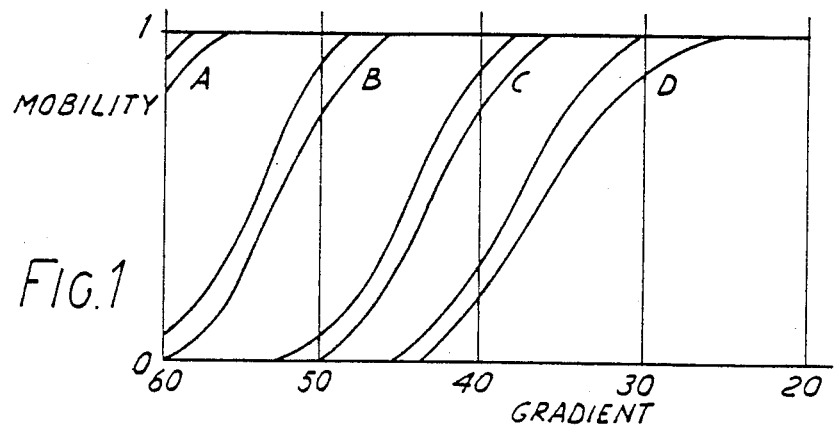

United States Patent [19]

Schram

[11] Patent Number: 4,877,516

[45] Date of Patent: Oct. 31, 1989

[54] MANIPULATING PARTICULATE MATTER

[75] Inventor: Cornelius J. Schram, Pavenham, England

[73] Assignee: National Research Development Corporation, London, England

[21] Appl. No.: 153,833

[22] PCT Filed: May 27, 1987

[86] PCT No.: PCT/GB87/00363

§ 371 Date: Jan. 27, 1988

§ 102(e) Date: Jan. 27, 1988

[87] PCT Pub. No.: WO87/07178

PCT Pub. Date: Dec. 3, 1987

[30] Foreign Application Priority Data

May 27, 1986 [GB] United Kingdom ............... 8612759

[51] Int. Cl.⁴ ............................................. B03B 3/02
[52] U.S. Cl. ....................................... 209/155; 209/2; 209/20; 209/590; 209/210; 210/748
[58] Field of Search ................ 181/0.5; 73/587, 589, 73/645, 646, 647; 210/748, 767; 209/2, 18, 20, 44.1, 133–135, 142, 154, 155, 173, 208, 210, 590

[56] References Cited

U.S. PATENT DOCUMENTS 3,826,740  7/1974  Jewett ............................ 210/748 X
4,055,491 10/1977  Porath-Furedi ................ 210/748 X
4,523,682  6/1985  Barmatz et al. ..................... 209/638
4,759,775  7/1988  Peterson et al. ................ 210/748 X

FOREIGN PATENT DOCUMENTS 147032  7/1985  European Pat. Off. .
167406  1/1986  European Pat. Off. .
3218487 11/1983  Fed. Rep. of Germany .
3218488 11/1983  Fed. Rep. of Germany .

OTHER PUBLICATIONS

Translation of Lierke DE No. 32 18 487 A1.
Copy of NASA Technical Brief, "Acoustical-Levitation Chamber for Metallurgy", 2301 N.T.I.S. Tech Notes, (1984) Apr., A-K, Springfield, VA, USA.

Primary Examiner—Joseph J. Rolla
Attorney, Agent, or Firm—Cushman, Darby & Cushman

[57] ABSTRACT

An acoustic standing wave is established in a fluid medium with a varying energy density in its nodal planes. Particles in the fluid medium responsive to the acoustic energy accumulate at these nodal planes and by the action of the variations of energy density in conjunction with the fluid viscous forces and/or field forces acting in the direction of the nodal planes, the movement of the particles held at these planes can be controlled. The adverse effects of attenuation of the acoustic beams producing the standing wave are reduced in this system, because any streaming due to imbalance of the acoustic forces forming the standing wave does not act in the direction in which the movement of the particles can be controlled.

19 Claims, 5 Drawing Sheets

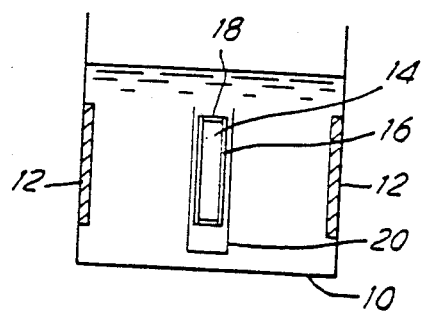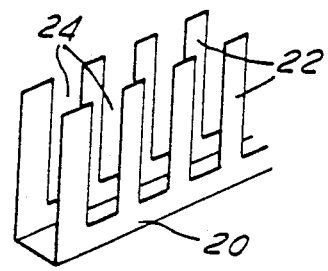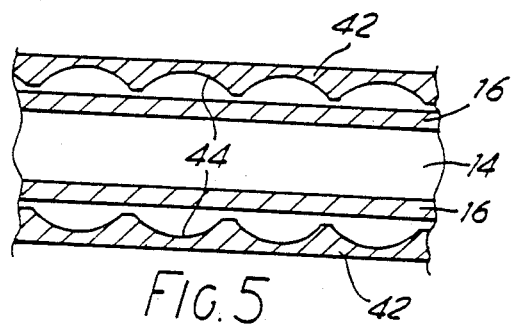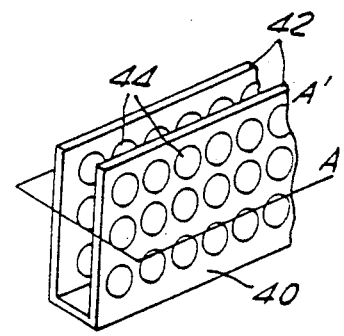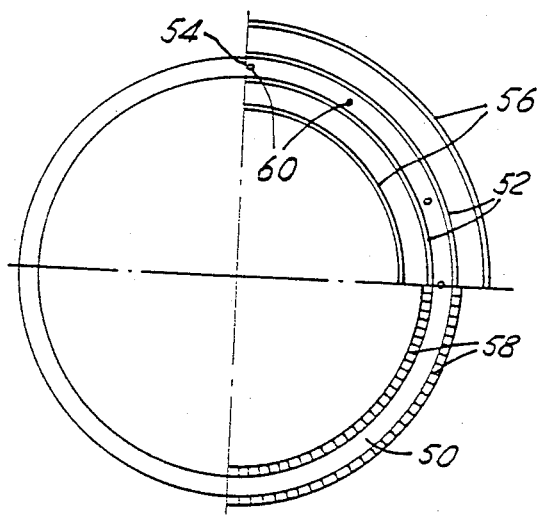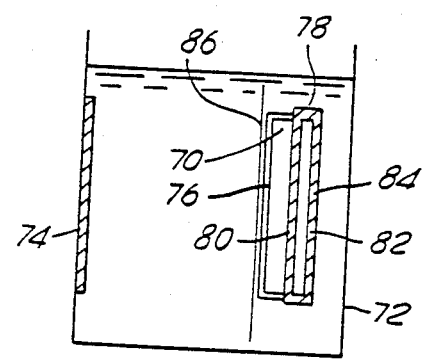

MANIPULATING PARTICULATE MATTER

This invention relates to the manipulation of particulate matter in a fluid medium by the use of ultrasonic wave energy, including the segregation of dissimilar particles from a mixture of particles.

Standing waves generated by acoustic energy sources have been used in a variety of ways to influence the behaviour of particles suspended in fluids, it being known that particles can be attracted to the nodes of the standing wave. In essence the attracted particles becomes concentrated at the nodal planes lying normal to the axis of propagation of the standing wave. At this juncture it should be said that the detailed theory underlying the observed phenomenon of standing waves and their effect of particles is not fully understood, in particular the factors influencing whether any given particle type tends to accumulate at the nodes or at the antinodes are unclear. However, this lack of theoretical understanding has no bearing on the practical application of the present invention and throughout this specification the terms nodes and nodal planes are used to include references to both nodes and antinodes, because in practice it does not appear to matter whether any given particle type collects at one or the other.

If a standing wave is moved along its axis, the particles attracted to the nodes can be carried through the fluid while they remain attached to the standing wave: this is proposed, for example, in G.B. 2098498A. In addition, it is found that particles with different acoustic properties, in particular particles with different sizes and densities, can be differently affected by the acoustic energy of a standing wave and it has been proposed to use ultrasonic frequencies to manipulate particles in a chromatographic analytical procedure, to separate different particle types. In U.S. Pat. No. 4,280,823 it is suggested that a standing wave can function as the plates of a conventional chromatographic column by retaining different particles at its nodes for different times, the particles being carried through the standing wave by a gas flow directed axially along it.

There may also be mentioned the apparatus described in U.S. Pat No. 4,523,632 (Barmetz et al) in which particles of different types are separated to some degree as they are carried by a liquid flow along the length of a horizontal chamber in which a standing wave is established with a wavelength that is half the height of the chamber. This results in a so-called force potential well in the mid-height region of the chamber in which the particles will tend to concentrate. The gravity forces on the particles cause some degree of vertical separation of the different types of particle, i.e. each type of particle will be located at a particular height representing an equipotential plane, dependent upon the influence of gravity on that particle type.

It is a characteristic of all these earlier proposals that controls or manipulation of particles attracted to the nodes relies on the acoustic forces acting on the particles in dependence upon the distance from each node, i.e. axially along the standing wave. One of the difficulties which exists in such a system and which becomes particularly acute at the higher ultrasonic frequency ranges suitable for processing smaller particles is that attenuation occurs in the energy propagated from the ultrasound source. Divergence of the beam accentuates this effect. There is therefore an energy density gradient experienced by the fluid as a unidirectional force, in effect a radiation pressure, which above a minimal value, produces movement of the fluid away from the radiation source. This movement of fluid, referred to herein as acoustic streaming, clearly can have a disturbing influence on any attempt to control the movement of particles by means of the acoustic forces acting directly on them, and especially if those acoustic forces are employed to discriminate between different particle types.

If a standing wave is formed in a body of fluid by a coaxial reflection of ultrasonic radiation from a single source, there will be a radiation pressure acting on the fluid throughout the field of the standing wave generating acoustic streaming. By using two opposed ultrasonic transducers to establish a standing wave by the interference between their outputs it is possible to balance out radiation pressure in substance, over a minor part of the distance between the sources. For a standing wave in water at 20° C., the following Table shows the total working distance available in mm with three different tolerance levels of imbalance for different frequencies, assuming a parallel acoustic beam:

TABLE 1

| Frequency MHz | Total working distance available (mm) Percent imbalance | | |
|---|---|---|---|
| | 5% | 2% | 1% |
| 0.3 | 11,400 | 4,400 | 2,200 |
| 1.0 | 1,000 | 400 | 200 |
| 3.0 | 114 | 44 | 22 |
| 10.0 | 10.3 | 4 | 2 |

Thus, at 3 MHz in water, 22 mm is available on either side of the point of exact energy balance if a maximum imbalance of 2% is acceptable, giving a maximum total working distance of 44 mm. As is clear from the Table the working distance available is increasingly restricted with rise of frequency, and this is the most significant single limitation on the use of higher frequencies.

Another factor is that while experimental work shows that, although it is possible to accept a degree of imbalance before this causes noticeable acoustic streaming, the volume available for a continuous process of discrimination between different types of particles by the use of ultrasound is inevitably limited by this phenomenon. It therefore becomes impractical to reduce the separation time for different particle types by increasing the volume of the working vessel, since the separation rate can only be increased in proportion to the square of the linear dimension.

The present invention is based upon the novel concept that, by means of non-uniform acoustic energy intensities in a nodal plane of a standing wave, it is possible to provide an alternative method of manipulating particles in a fluid medium which alleviates the problem of acoustic streaming and allows other advantages to be achieved as compared with the previously proposed methods which relay on controlling movement of the particles normal to a nodal plane.

According to one aspect of the invention, there is provided a method of manipulating particles in a fluid medium in which an ultrasonic standing wave is establishd in the fluid, said standing wave having a varying energy intensity in its nodal plane or planes in the fluid, the standing wave characteristics being chosen so as to accumulate at least a portion of the particles at the nodal plane or planes and the movement of said particles in the nodal plane or planes being controlled by means of the fluid viscous forces and/or field forces having at least a component acting in the direction of said plane or planes.

According to another aspect of the invention, there is provided apparatus for manipulating particles in a fluid medium comprising a chamber for containing the fluid with the particles suspended in it and means for generating an ultrasonic standing wave in the chamber, means for giving said standing wave a non-uniform energy intensity in its nodal plane or planes in at least a part of the volume of said chamber, whereby to control the movement of at least a proportion of the particles in a direction parallel to said nodal plane or planes by the action of said varying energy density in conjunction with fluid viscous forces and/or field forces having at least a component acting on the particles in the direction of said nodal plane or planes.

Convenient means of creating the non uniform energy intensity include the use of screens which create acoustic shadows, or generate diffraction or focusing effects. It may be sufficient, however, simply to rely on the non uniformity of an acoustic beam, in particular at its edges.

In practice the variation of energy intensity will usually be produced as a repeated pattern moving relative to the fluid medium in the nodal plane, which will be termed herein a "nodal wave".

Nodal waves will be generated by providing an array of energy gradients normal to the ultrasound propagation axis and moving the array along a nodal plane relative to the fluid in which the waves are propagated. The particles influenced by the acoustic energy thus move normal to the axis of the ultrasonic radiation which means that the length of the active zone in a working vessel is not limited by the ultrasound frequency. Attenuation does not occur in the direction of displacement of the energy gradients, so that with increase of scale the rate of separation can match the increase of working volume. Moreover, attenuation is less critical because a greater degree of imbalance will generally be acceptable in opposing beams operating normal to the plane of particle movement, since the residual streaming of the fluid does not act in the direction in which separation is occurring.

The use of nodal waves can allow considerable freedom in terms of variation of the level of the acoustic forces acting in different parts of a space, i.e. it is possible for nodal waves to be moved at different rates and operate with different intensities in different regions. Both temporal and spatial variations in velocity may be used.

The nodal plane or planes will usually lie parallel to opposed walls of a working vessel normal to the ultrasound propagation axis, and the geometry may be so arranged that these walls—possibly formed by the acoustic transmission plates themselves—coincide with planes where the standing wave is 180° out of phase with the nodes. Particles responsive to the ultrasound are therefore automatically held away from the walls, so as to inhibit the trapping of particles by adhesion and/or boundary layer effects.

The use of non-uniform energy densities in a nodal plane has so far been discussed in terms of energy density gradients that occur only along one axis, but it is possible to generate and make use of two-dimensional nodal waves. Thus, with a standing wave having an axis of propagation in the y direction, energy density gradients may be produced in a nodal plane in both the z and x directions.

In practical embodiments the nodal waves do not necessarily need to move rectilinearly. Particles in nodal waves may be moved in a curve and thus the working vessel may be in the form of a coil or a body of revolution. In general, however, very long working paths will not be necessary since the nodal waves will have the all-or-none discrimination character of any ultrasonic standing wave not unduly influenced by side effects such as acoustic streaming, as the following discussion illustrates.

In an ideal (i.e. non-viscous) fluid in which an array of nodes is generated by the propagation of ultrasound such that each nodal surface has a uniform acoustic energy density, movement of a particle parallel to a nodal surface can occur without changing the net free energy of the system, that is, no work is done in the movement of the particle, assuming no field forces (e.g. gravitational or electromagnetic) are acting on the particle. If the energy density is not uniform, a force proportional to the energy density gradient acts on the particle at the node in a direction co-planar with the node to urge the particles in the direction of increasing energy density.

In a real fluid, movement of the particle relative to the fluid will always be opposed by the Stokes forces (which term is used herein to include all drag forces experienced by the particle as a result of their movement relative to the carrier fluid). Taking the case of a particle suspended in a uniform fluid which is flowing normal to the axis of a standing wave, i.e. parallel to the nodes of the standing wave, against an acoustic energy density gradient, a particle at a node will be moved in the direction of the fluid flow if the Stokes forces are greater than the acoustic forces in the opposite direction caused by the local energy density gradient. If the energy gradient fluctuates across the nodal plane the particle will sometimes move faster as it approaches a high energy zone and sometimes slower as it leaves such a zone but in traversing the node the mean velocity of the particle in the direction of the fluid flow will be identical to that of the fluid. Similar considerations apply of course if the body of fluid is stationary and the standing wave is displaced normal to its axis.

To consider now the case in which the fluid flow and the displacement of the high energy zone are mutually perpendicular in the nodal plane, assuming that the Stokes forces attributed to the fluid flow remain greater than any acoustic forces on the particles in the direction of the fluid flow, as the particle encounters an energy density gradient in the direction of displacement of the high energy zone, one of two conditions will obtain, as follows:

(1) When the acoustic forces on the particle due to the movement of the gradient exceed the opposing Stokes forces, the particle will move with the velocity of displacement of the high energy zone so that when the fluid flow carries it out of the standing wave it will have undergone a displacement due to its entrainment by the acoustic forces acting in the direction of displacement of the high energy zone.

(2) If movement of the particle at the rate of displacement of the high energy zone would produce Stokes forces greater than the acoustic forces the particle experiences from the steepest energy gradient in the high energy zone, the particles can no longer be entrained by the movement of the zone relative to the standing wave.

When the high energy zone has crossed its path, the particle will have undergone no net displacement with it.

Thus, by regulation of the parameters and independently of a flow of carrier liquid along a nodal plane, it is possible to control the movement within the nodal plane of particles influenced by the acoustic energy, employing the movement of a non-uniformity in the acoustic energy density of the node, or an array of such non-uniformities giving a nodal wave.

If a population of similar particles are subjected to a nodal wave under conditions in which the acoustic and non-acoustic forces are virtually in balance individual particles will at different moments either move with the wave or will be given no net displacement by the wave. Over a period of time it will therefore move with an average velocity less than that of the wave. This property can be termed the nodal mobility (Mn) of the particle and will have a value between 0 and 1 inclusive since it is made up from a series of instantaneous mobilities of 0 or 1. The range of conditions in which a specific particle type will have a nodal mobility less than unity and greater than zero will be small, and in fact it is only the inevitable presence of minor disturbances that will prevent an abrupt changeover between these two end values.

Nodal mobility is dependent on the relative velocity between the field force and the nodal wave, so that a particle may simultaneously have different nodal mobilities in two mutually perpendicular directions in the nodal plane, since both the acoustic gradients and any opposing forces (e.g. Stokes forces or field forces such as gravity or electromagnetic fields) may be different in each direction. For example if in an orthogonal system an xz plane defines the nodal plane and the nodal wave is moving in the x direction, while there is a fluid flow in the z direction perpendicular to it, a particle can be differently and independently influenced in each of these directions and so have two nodal mobilities $M_{nx}$ and $M_{nz}$.

This may be contrasted with an arrangement, as in the prior art referred to above, in which to control a group of particles the balance of the acoustic and non-acoustic forces acting simply in the axial direction of the standing wave is utilized. The nodes of the wave are treated as essentially uniform acoustic force regions. Although this holds good only for the main cross-sectional area of the standing wave and there is an acoustic energy gradient at marginal regions, it has not been suggested, nor indeed would it be practical to make use of that variation to control the movement of particles, if only because such energy density gradients are too low.

The present invention can be applied in the manipulation of a wide variety of particulate matter, in which term is intended primarily to denote biological particles ranging from macromolecules (e.g. globular proteins) through viruses, bacteria and yeasts to tissue cell (e.g. plant cells, animal cells and all aggregates), and also inorganic and organic materials, such as dispersions, suspensions, finely-divided precipitates, colloidal and miscella-like systems.

Figure 2A:
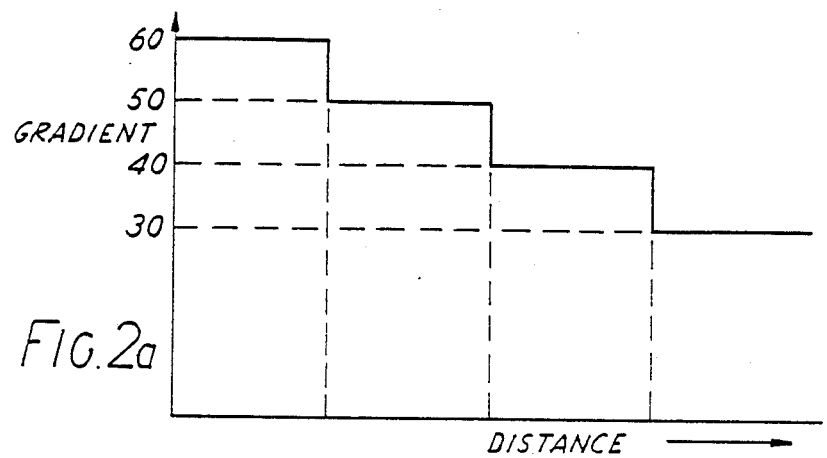
Figure 2B:
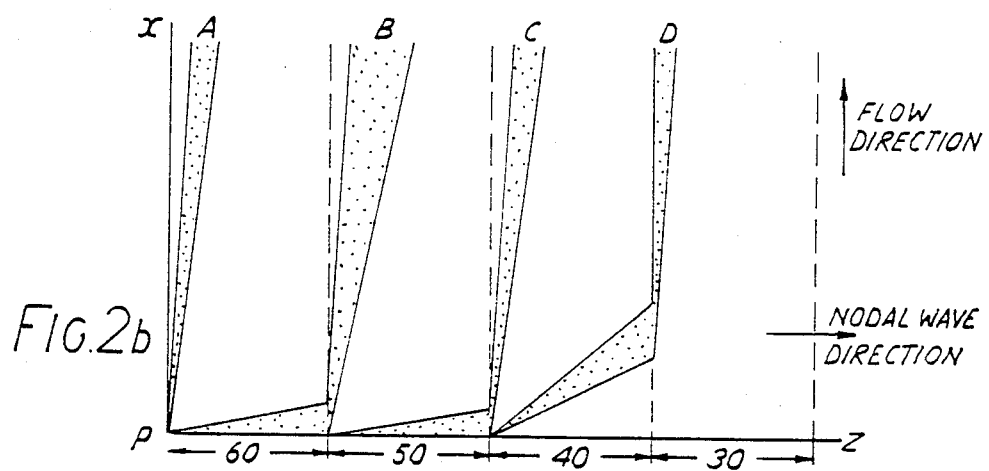
Figure 9:
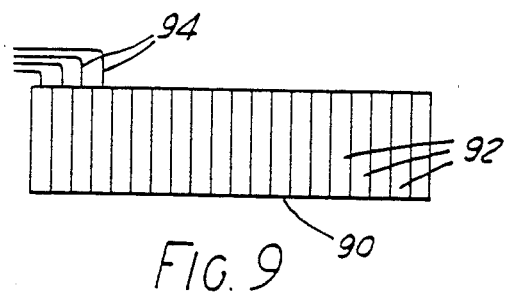
Figure 10:
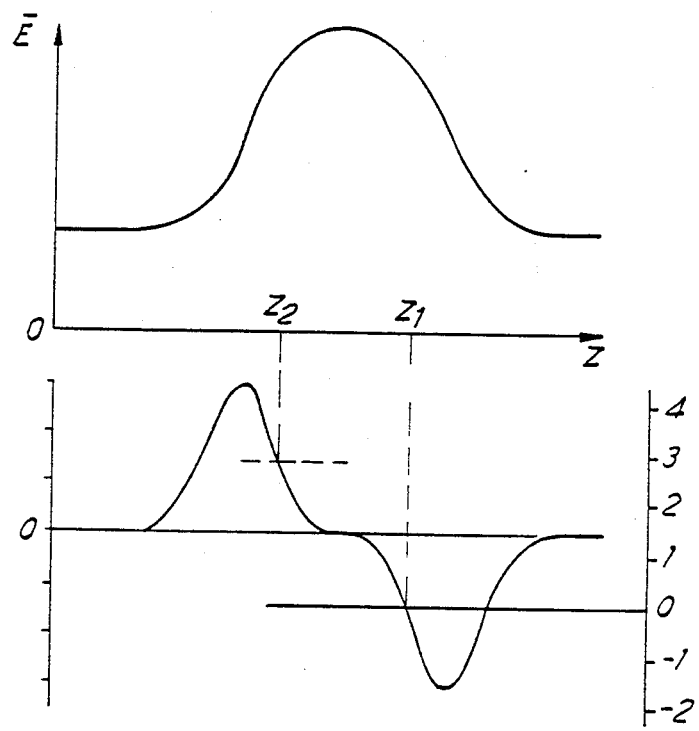
Figure 11:
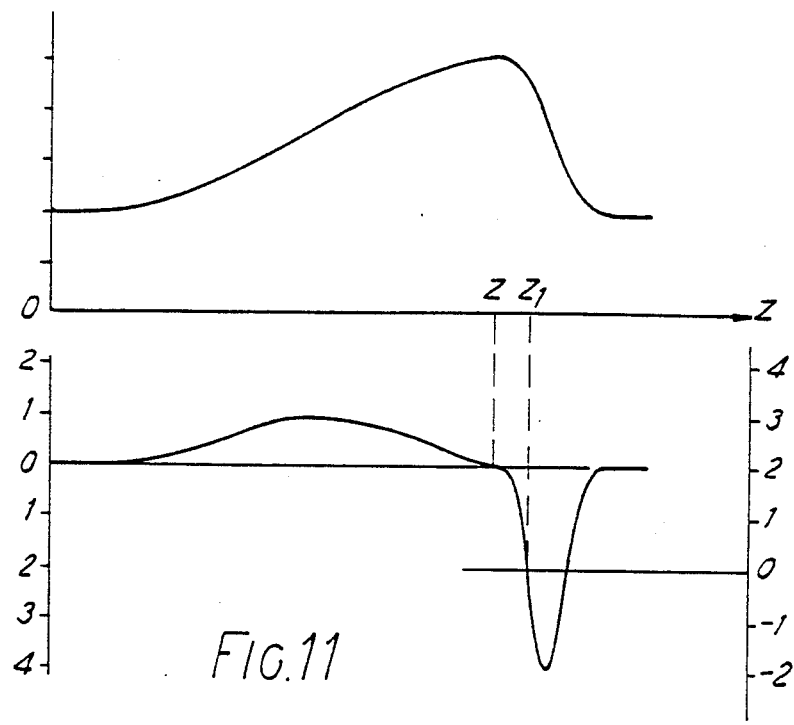
Figure 12:
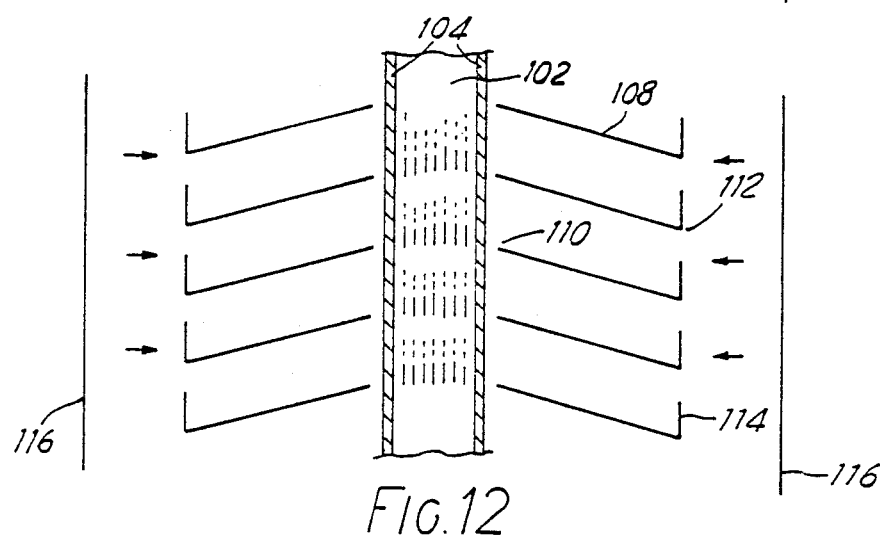
Figure 13:
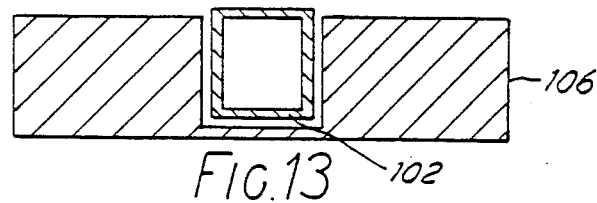
Figure 14:
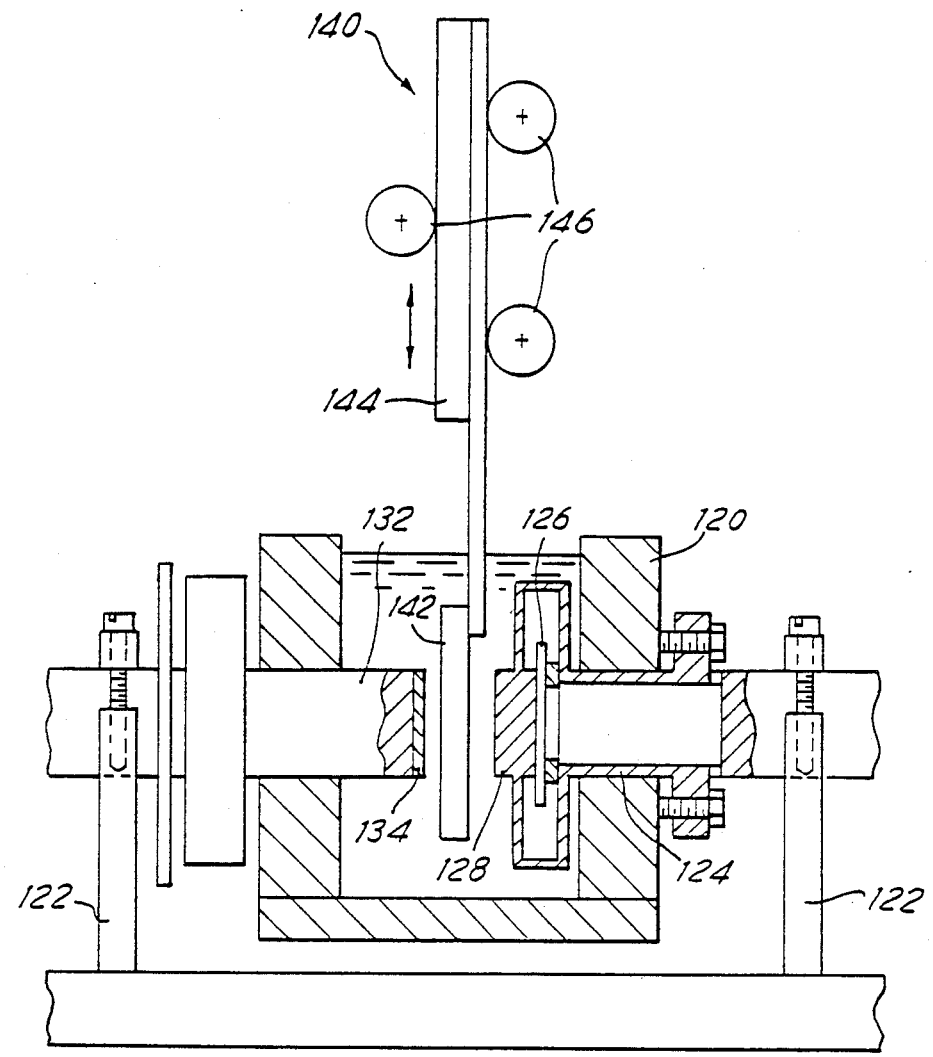

By way of further illustration, aspects of the present invention will be discussed and exemplified by reference to the accompanying schematic drawings, in which:

FIG. 1 is a graph illustrating the effects of a changing energy gradient on nodal mobility, FIGS. 2a and 2b illustrate, respectively, a non-uniform acoustic energy gradient with a stepped profile, and the use of this profiled gradient to separate dissimilar types of particles, FIGS. 3 and 4 are, respectively, a cross-section of an apparatus according to the invention and a shadow screen of the apparatus, FIGS. 5 and 6 illustrate a focussing screen for a modified form of the apparatus in FIG. 3, FIGS. 7 and 8 are cross-sections of two further forms of apparatus according to the invention, FIG. 9 illustrates a transducer array for generating a nodal wave, FIGS. 10 and 11 are graphical representations of acoustic energy distributions and gradients in a nodal wave, FIGS. 12 and 13 are side and plane views of a form of screen intended to produce asymmetric energy density gradients, and FIG. 14 is a schematic view of another form of apparatus according to the invention.

FIG. 1 is a plot of the change of nodal mobility of a series of different particle types A, B, C, D in relation to acoustic energy density gradient G. Type A particles are least influenced by the acoustic energy and can move against an energy density gradient in the nodal plane more easily than the other particles types. Particle types B, C, D are successively more easily held by the standing wave but around a critical value of the energy density gradient the nodal mobility of each type will change from 0 to 1, there being some spread at the critical value because of minor disturbances and non-homogeneities, the latter being likely to be significant among biological particles.

Purely for the sake of illustration, numerical values are indicated in FIG. 1 and associated FIGS. 2a and 2b. The nodal mobilities of the different particle types at particular acoustic energy density gradients fall within bands, the widths of which for each particle type can be tabulated as follows:

TABLE 2

| Particle type | Acoustic energy density gradient | | | |
|---|---|---|---|---|
| | 30 | 40 | 50 | 60 |
| A | 1 | 1 | 1 | 0.9 |
|   | 1 | 1 | 1 | 0.8 |
| B | 1 | 1 | 0.9 | 0.1 |
|   | 1 | 1 | 0.7 | 0 |
| C | 1 | 0.9 | 0.1 | 0 |
|   | 1 | 0.8 | 0 | 0 |
| D | 1 | 0.3 | 0 | 0 |
|   | 0.9 | 0.2 | 0 | 0 |

FIG. 2a represents an acoustic energy gradient pattern in a nodal plane xz of a standing wave in which a nodal wave is produced having at intervals in the z direction a series of stepped changes between the numerical values given in Table 2 for acoustic energy gradients $G_x$ and $G_z$ in the x and z directions. Consider such a pattern with reference to FIG. 2b where a mixture of the particle types A, B, C, D is introduced into the standing wave by a liquid flow in the direction x and the maximum energy density gradient is above the critical values of the particle types B, C, D but not that of type A. As will be apparent from FIG. 1 and Table 2, at each change of energy density gradient, the magnitude of the gradient drops below the critical value for a further particle type.

When the mixed particle types A, B, C, D enter the standing wave at point P the particles of type A are immediately able to pass through the standing wave with the liquid flow. The remaining particle types B, C, D are retained by the acoustic energy gradients $G_x$, $G_z$ but some weakening of the effect on the particles B will cause them to begin to spread in the x direction and slow down in the z direction. When the acoustic energy gradient value then drops below the critical value of the B type particles they are released from the standing wave to be carried away in their turn by the liquid flow, and the particle types C and D are carried off separately in a similar way.

This process thus allows specific particle types to be separated in sequence substantially at right angles to a stream of particles, the extent of that stream not being limited by the physical properties of the acoustic radiation.

Although the change in energy density gradients along the working path is shown decreasing in discrete steps to release successive particle types, in particular instances it may be preferred to employ a continuous variation, which may be linear or non-linear.

To separate different particle types it is in principle sufficient if they are sequentially released by the $G_z$ forces to be entrained by the liquid flow. If still held by the $G_x$ forces they will also move with the liquid but at a slower rate than if released simultaneously by the change of gradient in both directions, because they then have to fall back in the z direction relative to the nodal wave until they reach zones of smaller $G_x$ gradients.

For maximum discrimination between the different particle types the two gradients $G_x$, $G_x$ are equal so that for any particle type both $M_{nx}$ and $M_{nz}$ tend to 0 to 1 together, and the nodal wave velocity ($V_{nw}$) in the z direction should match the mean liquid flow velocity ($V_l$) in the x direction, i.e.

$$\frac{G_z}{V_{nw}} = \frac{G_x}{V_l}$$

A variety of means may be employed to generate and move nodal waves, both mechanical and electronic. A simple mechanical method is to cast a set of acoustic shadows which pass along a vessel, the shadow edges moving in the nodal plane, whether perpendicular or parallel or obilque to the fluid flow. At frequencies appropriate for a liquid medium such as water (i.e. upwards of about 500 KHz) relatively sharp shadows are obtainable; the higher the frequency the sharper the acoustic shadows, and frequencies in the MHz range will be usually be preferred.

An example of the use of a screen to produce such shadows is shown in the apparatus of FIGS. 3 and 4. In FIG. 3 can be seen in cross-section a tank 10 containing a suitable liquid to provide an acoustic coupling for barium zirconate titanate transducers 12 mounted at parallel opposite sides of the tank are at a suitable distance from a working column 14 immersed in the tank liquid and extending parallel to said sides of the tank within the length of the tank. The column has sides walls 16 transparent to the ultrasound frequency of the transducers. To facilitate observation, the end walls 18 and possibly also the side walls are transparent to light. The column is located within a shadow screen 20 that has side walls parallel to and almost touching the side walls 16 of the column.

The side walls of the screen comprise a series of parallel alternating vertical tongues 22 and slots 24 and the screen is of a material that reflects the ultrasound frequency employed. The tongues of opposite side walls are coincident with respect to the axis of propagation of the transducers 12. The screen thus provides alternate sections in which either the column is shielded from the ultrasonic transmission by opposite pairs of tongues 22, or is exposed to the ultrasound transmission passing unimpeded into the column through the intervening slots 24. An array of sharp-edged acoustic shadows are thereby formed in the standing wave produced by interference of the ultrasound transmissions entering the column through the slots. The shadows will be given a width and a spacing such as to ensure a series of spaced column-like standing waves is created in the working chamber between the successive spaces. Of particular importance is the sharpness of the shadow edges which determines the energy gradient. Since an ultrasonic beam is never fully collimated, some of the energy passing through the slots 24 will reflect off the inside surfaces of the tongues 22. If it is necessary to prevent the formation of a standing wave between opposing tongues by mutual reflection, the distance between the facing surfaces of the tongues should be an odd multiple of the quarter wave length.

FIGS. 5 and 6 show, for an apparatus otherwise similar to that in FIG. 3, a screen 40 enclosing opposite sides of the column 14 with its transparent side walls 16. In this instance, the screen is one with which nodal waves can be formed by refracting or focussing acoustic energy to produce a non-uniform energy density. It has walls 42 which are continuous and of a material having different acoustic transmission properties to those of the bath liquid at the wavelength of the ultrasound transmission. Formed on one or both of the surfaces of walls 42 is a grid of depressions 44, which may be spherical, the radius of curvature being chosen so as to cause a uniform incident transmission of ultrasound to form sharply converging beams as it passes through to the column 14. The spherical depressions in the opposing walls of the screen are aligned with each other so that the opposed converging beams in the column 14 are coaxial.

Focussing screens to provide the required acoustic energy gradients may of course have many different surface configurations, e.g. with part-cylindrical depressions to produce non-uniform acoustic densities in one direction only in the nodal plane.

Movement of screens such as those described above at an appropriate constant velocity (or such movement of the liquid carrying the particles) will allow the acoustic energy gradients to move particles relative to the liquid. Depending upon the form of the apparatus and the process to be operated in it, that may be a suitable form of displacement to employ, but other forms of displacement can be provided if required. Thus, after a movement over a distance equal to or exceeding the spacing between successive elements of the array of elements in the walls of the screen, the screen can be returned at a faster rate to its starting position. The object of this quick return is to transfer particles to the energy gradients associated with a succeeding element when their return movement with the screen is opposed by the great Stokes forces related to the increased return velocity. The conditions are such that the particles are swept from the energy gradients on which they have been held. The particles are thus progressed along the length of the screen by continued repetition of this cycle of movement. As will be appreciated in the numerical example given with FIGS. 3 and 4, the screen may need an oscillation of only one or two millimeters.

Since a screen such as that shown in FIGS. 5 and 6 can be static if the liquid column 16 is moved instead, it will be clear that a discrete screen element is not then required. This leads to the possibility of coupling the ultrasonic transducer to the working liquid through an acoustic coupling block that is configured to provide the required focussing effect. Acoustic coupling blocks of metal, e.g. aluminium alloy, are themselves known; to provide a focussing effect similar to that described with reference to that described with reference to FIGS. 5 and 6 the interface between the distal end of the coupling block and the liquid is given a series of, e.g. spherical, depressions corresponding to the depressions A4 of FIG. 5, whereby each such depression similarly focusses the ultrasound entering the liquid. A wall at the opposite side of the liquid column has similar depressions, coaxial with those of the coupling block. With that wall surface at an appropriate spacing from the coupling block, the nodal surfaces of the standing wave will contain sharp energy gradients. It should be noted that the dimensions of the lens elements must be longer than the wavelength of the ultrasound in the metal.

Ceramic transducers can be easily and cheaply produced in a wide range of sizes and shapes, and these ferroelectrics require only modest voltages to provide useful power. It is therefore practical to use relatively large scale cylindrical transducers to provide cylindrical nodal surfaces. FIG. 7 shows in cross-section a tubular column 50 having concentric cylindrical side walls 52 spaced apart a short distance, say 5 mm, but enclosing an annular space of much greater depth. A septum 54 completely blocks the annular space at one point in its circumferential extent. Cylindrical ceramic transducers 56 (shown in the first quadrant only) extend coaxially around the column. A cylindrical shadow screen 58 (shown in the second quadrant only), also coaxial with the column, has slotted walls as previously described, the slots extending axially of the column. Means (not shown) are provided to oscillate the screen about the axis of the column.

Ports 60 are positioned as required, at various points around the circumferential extent of the column to provide liquid inlets and outlets for establishing different liquid flow velocity regimes in different parts of the column so that the differential separation effect already described with reference to FIG. 1 can be obtained without varying the rate of progression of the nodal waves.

The cylindrical configuration may also be used if it is required to produce a continuously moving train of nodal waves, this being possible by a continuous, uniform displacement of the screen.

Where the apparatus employs a shadow screen, as in the examples of FIGS. 2 and 3 and FIG. 7 it is possible to combine the screen and the working chamber walls, the opposed walls through which the acoustic energy is to be transmitted then being formed from alternate strips of transmitting and reflecting materials, e.g. polymethyl methacrylate or polystyrene for the former and tungsten or aluminium for the latter. The ports can be set in the reflecting strips to extend over at least a substantial part of the axial length of the column. As another alternative, it may be desirable to position a shadow screen within the working column. Putting an oscillating screen at the side walls of the column the movement of the screen can help to prevent particles becoming attached to the side walls and can generate sharper shadows than if outside the walls.

The preceding examples use two opposed transducers, which allow the energy intensity of the transmissions forming the standing wave to be matched sufficiently closely in a limited region to avoid acoustic streaming in substance, but as already indicated a greater degree of acoustic streaming can be tolerated if the particles are not being manipulated by acoustic forces acting along the axis of the standing wave. Thus, it is possible to operate with an ultrasonic transducer only at one side of a working space, if that space is not too wide and a high efficiency reflection surface is placed close to its opposite side.

FIG. 8 shows in cross section a column 70 set in a liquid bath 72 at some distance from and parallel to a ceramic transducer 74 extending the full length of the column, the bath liquid providing acoustic coupling between the transducers and the column. The column has a side wall 76 transparent to ultrasound at the operating frequency of the transducer and an opposite side wall 78 which is a highly efficient reflector. Conveniently, the side wall 78 is also transparent to light to allow the interior of the column to be viewed; for example, it could be composed of a glass plate 80 of a thickness to reflect the ultrasound and backed by an air space 82 formed with a further glass plate 84. Alternatively, side wall 76 and screen 86 can be transparent to light, if the reflector is opaque.

Immediately in front of the column 70 is a shadow screen 86 arranged to be displaced as already described by means (not shown). The transmission from the tranducer is thus reflected from the plate 80 to form a standing wave by interaction with the incident transmission from the transducer with only a moderate degree of acoustic streaming resulting from the inevitable imbalance of the incident and reflected waves.

It will be understood that the geometry of the device can be varied, e.g. to the cylindrical configuration already described.

Nodal waves may also be generated and displaced electronically by control of an array of transducers set side by side and, indeed, a single ultrasonic transducer can produce different oscillations in a sequence of zones electrically isolated from each other. FIG. 9 shows a surface of a rectangular ceramic transducer 90 in which the elctrically conductive coating on the reverse side is continuous but that on the front face is divided into strips 92 electrically isolated from each other. The whole transducer is of uniform thickness and thus has a uniform resonant frequency, i.e. the resonant frequency of each strip 92 is the same.

When two such transducer mosaics are arranged parallel and face to face with opposing strips electrically energised, a standing wave is generated between them by the two interfering beams. These beams exhibit a small degree of divergence, and the width of each strip must be somewhat narrower than the diverging fringe of the ultrasonic beam overlapping it from an adjacent strip. The divergence angle depends on the geometry of the strip, the frequency of the ultrasound and the distance between the transducer face and the working volume.

The individual strips have separated electrical switching connections 94 so that a selected group of the strips can be energised together, and the energised regions can be displaced along the array by appropriate switching means (not shown) acting through the electrical connections to bring the strips into and out of operation sequentially. When the arrays on either side of a working space are energised synchronously in such a sequence, it is possible to generate a standing wave that effectively moves along the column.

This may be exemplified by reference to FIG. 9 with the series of strips 92 numbered 1 to 9. It can be assumed that a corresponding transducer mosaic is directly opposite this illustrated mosaic. Opposed pairs of strips of the two mosaics are controlled to switch simultaneously, and the following description will refer, for simplicity, to the operation of only one series.

If initially the strips 3 and 4 are operating, the divergence of the beams generated by these strips generates energy gradients in the space adjacent to the volume that lies directly between them, that is, these gradients extend to the space opposite strips 2 and 5. If strip 3 is de-energised, particles held in the standing wave in the volume between this strip and its opposite number are no longer in a high energy field, but are in the energy gradient associated with the periphery of the beam generated by the strip 4. The particles influenced by the acoustic energy will therefore move up the energy gradient towards the areas of maximum energy density, that is, towards the middle of the field generated by a strip 4. Strip 5 is next energised, and then strip 4 is deenergised so that the energy gradient is again displaced. This procedure is continued along the successive strips to progress the particles through the working volume.

The transducers shown in the preceding examples have been spaced some distance from the working volume which can thus be assumed to be in the far field of the energy propagation from the transducers. However, it is also possible to make use of the pheomenon that at a point in space close to a radiating surface the emissions from that surface will have significant phase differences due to the Fresnel diffraction pattern. This creates in the near field a complex pattern of domains of high and low acoustic energy density. With increase of distance from the radiation source, that no longer happens and in the far field, in which a Fraunhofer diffraction pattern is established, the acoustic field is uniform, decreasing slowly depending on beam spread and attenuation. Since the operation of a device according to the present invention requires acoustic energy density gradients in a nodal surface, by matching of the energy distribution in the near Fresnel field with that from a second transducer placed closed to and in face to face relation with the first transducer, a standing wave is produced. In that standing wave there are acoustic energy gradients which, acting on particles responsive to these gradients, group the particles in planar regions that can be identified as the nodal planes of the field, albeit that there are wider variations of energy intensity in these planes by virtue of the Fresnel diffraction fields that prevail. Similarly, the Fresnel field form a simple transducer can be reflected back to that transducer to produce like acoustic energy density gradients. Near field systems such as these containing appropriate energy density gradients may be employed, e.g., with the cylindrical configuration shown in FIG. 6.

The sharp lateral variations in acoustic intensity in the near field may also be employed to form a standing wave by reflection. A reflector is placed parallel to the emitting surface of the transducer and in its near field such that the high intensity regions of the primary radiation coincide with other intensity regions of the reflected radiation, and there is a similar conicidence of low intensity regions.

The forces acting on a particle on either side of a nodal plane in a standing wave are necessarily symmetrical in magnitude but opposite in direction. However, a nodal wave, being a progression of variations in the energy density of the standing wave in the plane of a node, can have asymmetric energy density gradient and that can be put to use in the operation of the present invention.

FIG. 10 shows in its upper part a symmetrical distribution of acoustic energy density in the z direction to either side of a point of maximum energy density. Below this is shown the magnitude and direction of the gradients in the energy density distribution, these energy density gradients being a measure of the net acoustic force on a particle.

On the left hand side of the gradient plot the scale shows the size and the direction of the forces on the particle when no relative motion exists between the high energy zone and the liquid. On the right hand side the scale shows the net forces on a particles when a Stokes force due to a constant velocity fluid flow from left to right is added to the acoustic forces. In the latter instance, the particle will come to rest in position $z_1$ along the z axis. By reversing the direction of the liquid flow without changing its magnitude, the particle will move to position $z_2$.

In contrast to FIG. 10, FIG. 11 shows an example of an asymmetric distribution of energy density in the z direction about a point of maximum energy density, and also shown are the magnitude and direction of the gradients and thus the acoustic forces on a particle.

With no relative motion between the high acoustic energy domain and the liquid, the particle will move to position z on the z axis wherein the energy density is greatest. If a positive Stokes force is added to the acoustic force by relative movement of the liquid to the right, the particle will move to position $z_1$ where the net forces acting on it are now zero. It is clear from FIG. 11 that by reversing the relative movement without changing its magnitude, the particle will be released from the nodal wave and will move to the left and out of the region of higher energy density. There is therefore a means of moving particles in one direction even when there are equal cyclic movements in opposite directions between the standing wave and the liquid.

Thus, to move particles using nodal waves by the ratchet method as described in relation to FIGS. 3 and 4 it is possible to employ either symmetrical energy gradients and asymmetric motion, or asymetic energy gradients and symmetrical motion, e.g. sinusoidal, or a combination of both.

FIGS. 12 and 13 illustrate an example of the use of asymmetric gradients produced by a shadow screen whose leading and trailing edges are not equally sharp. It shows a part of a column 102 having side walls 104 which are transparent to ultrasound at the frequency used. An acoustic shadow screen 106 comprises opposed arrays of walls 108 set obilquely to the axis of column 102 such as to provide in effect to a set of slots formed between the inner edge 110 of each wall 108 and the outer edge 112 of the wall immediately above it. The inner edges 110 are close to the column 102. Short flanges 114 projecting from the outer edges prevent sound reflecting from most of the length of each wall into the column. Strip ceramic transducers 116 set at an appropriate distance parallel to the column and energised by a common signal source provide a standing wave through the slots in the screen to generate a series of nodal planes within the column which have asymmetric energy density gradients.

By moving the screen upwards, particles are moved with the nodal waves, but when the screen is moved downwards, particles are not moved. If the screen oscillates symmetrically about a mean position with an amplitude which equals or exceeds the distance between the slots in the screen, particles will progress upwards. Alternatively, the screen may remained fixed while the column oscillates symmetrically with the same amplitude.

As a further example, FIG. 14 illustrates an apparatus according to the invention using a standing wave set up in the near field by reflection.

A water-filled vessel 120 is shown mounted on supports 122. Projecting into one side of the vessel is a housing 124 of Dural (British Standard HE15HF) for a 25 mm diameter transducer type PC5 (Unilator Limited, Wrexham Clwyd, Wales) acoustically coupled to a 17 mm diameter block 128 that is an integral part of the Dural housing. The operating frequency of the transducer 126 is 2.100 MHz. The block has a thickness of 9.09 mm, with a sonic velocity in the alloy of 6400 m/s. This corresponds to 5.97 halfwave lengths, i.e. sufficiently close to an integral number of halfwave lengths to provide essentially maximum transmission, while the distance is short enough to ensure that the block occupies less than half the axial length of the near field (in which Fresnel diffraction determines the spatial distribution of energy). The acoustic coupling between the transducer and the water is obtained using a water-based couplant (Ultragel from Diagnostic Sonar Limited, Houston, Scotland).

Into the opposite side of the vessel there projects a Dural rod 132 on the face of which is mounted a tungsten plate 134, 17 mm diameter and 1.00 mm thick, with its face at a spacing of 4.947 mm from the coupling block, the opposed faces of the plate and the block being parallel and coaxial. As the sonic velocity in the water of the vessel if 1484 m/s at 20° C., at the transducer frequency the gap between the block and the plate accommodates 14 halfwave lengths, so promoting a standing wave having a standing wave ratio of 1.0.

On the mounting 140 above the vessel there is suspended a rectangular chamber 142 having acoustic windows of 3-micron mylar polyester film facing the block and the plate. The chamber is provided with inlet and outlet porting (not shown) for a continuous throughflow but in the experiment to be described the porting was closed after a suspension of 1% by weight of 6 micron polystyrene microspheres in water was placed in the chamber.

This mounting 140 comprises guides 144 running between rollers 146 for linear movement of the chamber into and out of the vessel parallel to the block and the plate.

With the transducer energised the chamber was displaced on the rollers to pass through the resonant cavity between the block and the plate. The walls of the vessel and of the chamber parallel to the plane of the drawing were transparent, permitting observation of the contents of the chamber through a tele-microscope and it was observed that the particles in the chambers retained their positions relative to the acoustic field, independently of the movement of the chamber. Thus, as the chamber was withdrawn vertically from the vessel at a speed of 1 mm/s the particles resisted the Stokes forces of the carrier fluid to remain fixed in space and thus separate from the suspension to collect as a dense deposit at the base of the chamber.

I claim:

1. A method of manipulating particles in a fluid medium, comprising the steps of:
   (a) injecting ultrasonic energy into a fluid medium and establishing an ultrasonic standing wave in the medium;
   (b) choosing standing wave characteristics of said standing wave in relation to the particles so as to accumulate at least a portion of the particles at least at one nodal plane of the standing wave in the fluid medium;
   (c) giving a varying spatial energy density distribution to said standing wave in at least one of its at least one nodal planes in the fluid medium; and
   (d) controlling positions of the particles in said at least one nodal plane by the varying energy density of the standing wave in each said at least one nodal plane.

2. A method according to claim 1 wherein said controlling positions step includes maintaining each said particle substantially fixed in position in relation to the varying energy density distribution of its at least one nodal plane, against a relative displacement between the standing wave and the fluid medium in the direction of said at least one nodal plane.

3. A method according to claim 1 wherein said controlling positions step includes displacing the particles along said at least one nodal plane relative to the varying energy density therein by means of at least one force selected from the group consisting of the viscosity forces of the fluid medium with respect to the particles, and field forces, said at least one force having at least a component acting in the direction of said at least one nodal plane.

4. A method according to claim 1 wherein the standing wave has said varying energy density distribution in mutually transverse directions, parallel to the at least one nodal plane, to influence the particles independently in each said direction.

5. A method according to claim 1 wherein each of the at least one nodal planes are curved.

6. A method according to claim 1 wherein said giving a varying energy density comprises using a change of density at the edge of an acoustic beam to provide said varying energy density.

7. A method according to claim 1 wherein the varying of acoustic density is produced as a spatially repeated pattern in each of said at least one nodal plane.

8. A method according to claim 1 comprising the step of establishing a near field region of the standing wave in the fluid medium to provide said varying energy density in at least one of said at least one nodal planes.

9. A method according to claim 1 comprising the further steps of generating a relative reciprocatory movement between the standing wave and the fluid medium parallel to the said at least one nodal plane, and generating at least one different parameter from the group consisting of (a) velocity of movement and (b) acoustic gradient that has different magnitudes in the opposite directions of reciprocation whereby to produce a net directional effect for effecting said control of the movement of the particles in one of said directions.

10. Apparatus for manipulating particles in a fluid medium comprising:
 a chamber for containing the fluid with particles suspended in the fluid;
 means for generating an ultrasonic standing wave having at least one nodal plane in the chamber; and
 means for giving said standing wave a non-uniform spatial energy density distribution in said at least one nodal plane, whereby in a direction parallel to said at least one nodal plane at least a proportion of the particles are controlled by the action of said non-uniform energy density in relation to non-acoustic forces acting parallel to said least one nodal plane.

11. Apparatus according to claim 10 wherein the chamber has opposed walls parallel to the at least one nodal plane.

12. Apparatus according to claim 10 wherein the chamber is in the form of a body of revolution and the at least one nodal plane are curved substantially coaxially with the chamber curvature.

13. Apparatus according to claim 10 further comprising screening means between said generating means and said particle-containing fluid to give said non-uniform energy density distribution.

14. Apparatus according to claim 13 wherein the screening means comprise alternate ultrasonic transmitting and non-transmitting elements.

15. Apparatus according to claim 13 wherein the screening means comprise at least one diffracting element for the energy propagation.

16. Apparatus according to claim 15 wherein said at least one diffracting element is integrally formed on a coupling member that couples the acoustic generating means to the fluid medium.

17. Apparatus according to claim 13 wherein the screening means forms at least one boundary of said chamber.

18. Apparatus according to claim 10 comprising an array of ultrasonic transducers and means for energizing said transducers in sequence to generate a standing wave that has a variation of energy density in said at least one nodal plane with a distribution that is time-dependent whereby to cause displacement of at least one density peak in the direction of the at least one nodal plane.

19. Apparatus according to claim 10 wherein the chamber is in the form of a coil and the at least one nodal plane are curved substantially coaxially with the chamber curvature.

* * * * *